United States Patent [19]
Koyari et al.

[11] Patent Number: 4,879,874
[45] Date of Patent: Nov. 14, 1989

[54] LIQUID FUEL ROCKET ENGINE

[75] Inventors: Yukio Koyari; Eiji Sogame, both of Tokyo; Kanji Kishimoto; Yojiro Kakuma, both of Aichi Pref., all of Japan

[73] Assignee: National Space Development Agency of Japan, Tokyo, Japan

[21] Appl. No.: 182,938

[22] Filed: Apr. 18, 1988

Related U.S. Application Data

[63] Continuation-in-part of Ser. No. 47,163, May 6, 1987, abandoned.

[30] Foreign Application Priority Data

May 7, 1986 [JP] Japan ................... 61-104481

[51] Int. Cl.[4] ............................... F02K 9/46
[52] U.S. Cl. ...................... 60/259; 60/260; 60/267; 239/127.3
[58] Field of Search ............ 60/259, 260, 267; 239/127.1, 127.3

[56] References Cited

U.S. PATENT DOCUMENTS

| | | | |
|---|---|---|---|
| 3,024,606 | 3/1962 | Adams et al. | 60/267 |
| 3,077,073 | 2/1963 | Kuhrt | 60/259 |
| 3,168,807 | 2/1965 | Ledwith et al. | 60/267 |
| 3,516,254 | 6/1970 | Hammond | 60/267 |
| 3,605,412 | 9/1971 | Stockel | 60/260 |
| 3,613,375 | 10/1971 | Abild | 60/267 |
| 3,713,293 | 1/1973 | Simon | 60/260 |
| 4,107,919 | 8/1978 | Sokolowski | 239/127.1 |
| 4,223,530 | 9/1980 | Kirner et al. | 60/259 |

Primary Examiner—Donald E. Stout

[57] ABSTRACT

The present invention is related to a liquid fuel rocket engine of the type that a liquid fuel is boosted in pressure by way of a booster means. Thus boosted liquid fuel is gasified with a fuel cooling jacket of a fuel combustor means with an expansion pressure of thus gasified fuel being adapted to energize the booster means, and the gasified fuel is sent to the fuel combustor means so as to be combusted therein to produce a combustion gas to be discharged outwardly serving as a propulsive effort of the rocket engine, wherein there is mounted an expansion nozzle cooling jacket means around the circumference of a high expansion nozzle means of the combustor means, wherein part of the gasified fuel from the combustor cooling jacket means is directed into the expansion nozzle cooling jacket means to be reheated therein resulting in an increased potential energy to be utilized as a potential energy for driving the booster means, and wherein the remaining major part of gasified fuel from the combustor cooling jacket means is fed intact into the combustor means, not utilized to energize the booster means, so that it may be combusted to be discharged as propulsive force, whereby a pressure loss of the gasified fuel is held to a minimum, while establishing a potential energy made available for driving the booster means.

3 Claims, 10 Drawing Sheets

LIQUID FUEL ROCKET ENGINE

This is a continuation-in-part of application Ser. No. 47,163 filed on May 6, 1987, now abandonded.

FIELD AND BACKGROUND OF THE INVENTION

The present invention relates to a rocket engine using a liquid fuel, and more particularly to an improvement in the fuel system for use in a rocket engine wherein a pressure drop of a chemical liquid fuel is minimized to ensure a stable supply of power for a gasified fuel pressure booster of a rocket engine.

In the art of rocket engine, there is generally known a liquid fuel rocket engine of expander cycle type. Now, reference is made to a typical basic construction of this type rocket engine as shown in FIG. 2, which is constructed such that a propellant 1, for example, liquid hydrogen is pressurized to a desired pressure level by means of a fuel pressure booster 3, which is a fuel pump, and wherein a second propellant 2, for example, liquid oxygen which is an oxidizing agent reacting with the first propellant 1 to be deflagrated together is pressurized to a certain desired pressure by means of another pressure booster 4 for an oxidizing agent, which is an oxidizer pump. With this construction, thus-boosted propellant (liquid oxygen) 2 is then directed to a combustor 6. On the other hand, it is also constructed that thus-boosted propellant (liquid hydrogen) 1 is directed through a combustor cooling jacket 7 as arranged extensively around the combustor 6 so as to cool-off the same, and then is redirected to a booster driving unit 5 such as a gas turbine and the like mechanism, which is driven in rotation with this propellant, from which it is further directed to the combustor 6. In this combustor 6, the propellants 1 and 2 react with each other to be combusted or deflagrated together to produce a high pressure gas stream, which is to be released outwardly through an expansion nozzle 8 so as to generate a great propulsive force of a rocket engine.

The propellant 1 boosted in pressure by means of the fuel booster 3 gains a temperature rise while cooling-off the combustor 6, also having a concurrent pressure rise. With thus-gained pressure of the propellant 1, the booster driving unit 5 is driven in rotation, accordingly.

The driving power from the booster driving unit 5 is adapted to drive each of the fuel and oxidizer boosters 3 and 4 in rotating motion by way of a gear transmission 10.

According to the conventional rocket engine construction wherein the propellant 1 gaining heat from part of the heat as generated from the combustor 6 is adapted to be a driving medium for the fuel and oxidizer boosters 3 and 4, it has generally been arranged such that the whole quantity of the propellant 1 with heat gains is directed to use as the driving fluid for the both boosters 3 and 4.

Also, it is the common practice in the conventional arrangement of a rocket engine that heat as generated from the combustor 6 is absorbed by cooling the same with the liquid phase propellant, and this is the so-called regeneration-cooling system. In such arrangement that the whole quantity of the propellant 1 which is once used for the purpose of cooling of the combustor is adapted as the driving medium for the fuel and oxidizer boosters 3 and 4, however, it is essentially required that the fuel booster 3 for that propellant 1 should be designed with a substantial capacity which is large enough to compensate for a loss in pressure as generated while passing through the combustor cooling jacket 7, plus an inevitable pressure drop as encountered in the driving of the booster driving unit 5, and so it is consequently required to employ a large capacity booster unit to counter such losses in pressures, accordingly.

In coping with such undesirable problems, there is proposed a countermeasure in design as typically shown in FIG. 3 such that a subcombustor 11 which is adapted as a drive source for the fuel booster 3 to introduce part of the propellants 1 and 2 thereinto so as to be combusted therein and have thus-produced combustion gas made available for energizing the fuel booster, which is of the so-called gas generation cycle system. With such a construction, however, it brings such drawback that the entire system may inevitably turn out to be complex in construction, and thus resulting in a substantial increase in weight and hence reduction in the reliability of the system. In this arrangement as shown in FIG. 3, there is seen provided an expansion nozzle cooling jacket designated at the reference number 9 defined extensively around a high-expansion nozzle 8 and adapted to pass a coolant therethrough in such a manner that part of the propellant 1 from the combustor cooling jacket 7 is introduced as a coolant for the high expansion nozzle 8 through the expansion nozzle cooling jacket 9, and that propellant is then discharged outwardly to the atmosphere.

Also, a system has been known in which, as shown in FIG. 4, the subcombustor 11 is eliminated and a lower end outlet of the high expansion nozzle cooling jacket 9 is connected to the booster driving unit 5 so that the thermal energy the propellant 1 coming out of the cooling jacket 9 is used in the driving units (this system will be called a "down pass system" hereinafter).

The present invention is essentially directed to the provision of a due and proper resolution to such inconveniences and difficulties in practice as outlined above and experienced in the conventional liquid fuel booster for a rocket engine which has heretofore been left unattended with any proper countermeasures therefor.

SUMMARY OF THE INVENTION

It is therefore a primary object of the present invention to provide an improved liquid fuel rocket engine wherein the propellant can efficiently be raised up to a specified high pressure level with a simple rectification in construction to provide a reserve of pressure available for the driving of the propellant (liquid fuel) booster, accordingly. Also, it is another object of the invention to provide a relatively simple construction of a liquid fuel rocket engine with a light weight and hence a less production cost, yet with a high reliability in operation.

The above object of the invention can be attained accordingly as shown in FIGS. 1 and 5-11 from an improvement in a propellant booster for use in a liquid fuel rocket engine having a fuel booster means 3 for boosting the pressure of fuel component, an oxidizer booster means 4 for boosting the pressure of oxidizer component, two booster driving means for energizing the two booster means, a combustor means 6 wherein the booster fuel and oxidizer components are put into combustion to produce a combustion gas to be discharged outwardly, a combustor cooling jacket means 7 mounted operatively around the circumference of the combustor means, a high expansion nozzle means 8 extending from the combustor means 6, and an expansion nozzle cooling jacket means 9 disposed operatively around the circumference of said high expansion nozzle means 8 having an outlet from the fuel booster means 3 connected operatively to an inlet to the combustor cooling jacket means 7, having an outlet from the combustor cooling jacket means 7 connected operatively to a fuel inlet to the combustor means 6 an to an inlet to the expansion nozzle cooling jacket means 9, and having an outlet from the expansion nozzle cooling jacket means connected to an inlet to the two booster driving means 5, respectively. The engine is characterized in that the expansion nozzle cooling jacket means 9 comprises an alternating arrangement of upflow and downflow tube means 11, 12 along the surface of the high expansion nozzle means 8, the upflow and downflow tube means being connected to each other at their lower ends 13, the outlet from the combustor cooling jacket means 7 being connected to the downflow tube means 11, and outlets from the upflow tube means 12 being connected to an inlet to one of the booster driving means 5.

According to this advantageous construction of a rocket engine propellant booster of the present invention (called a "down-up pass system" hereinafter) as summarized above, there is attained an advantageous effect such that only a minor part of propellant required specifically for the driving of the propellant booster in rocket engine system out of the total quantity thereof boosted by the booster and with a moderate temperature rise as gained from the cooling of the combustor is then reheated to a desired level by utilizing the heat of a nozzle arrangement, which is part of the combustor, so as to obtain a substantial increase in its thermal energy to such an extent as made available as a medium for energizing the propellant booster.

With this improvement in construction, therefore, there is no need for such a combustor arrangement as required in the conventional rocket engine propellant booster, hence without any further components required in construction, and so there is naturally attainable advantageous effects such as a light weight and hence a less production cost, yet with a substantial improvement in reliability, accordingly. To add to these advantageous effects, the heat absorption efficiency at the high expansion nozzle 8 is improved in comparison to the conventional down pass system.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention are illustrated.

DETAILED DESCRIPTION OF THE INVENTION

Figure 1:
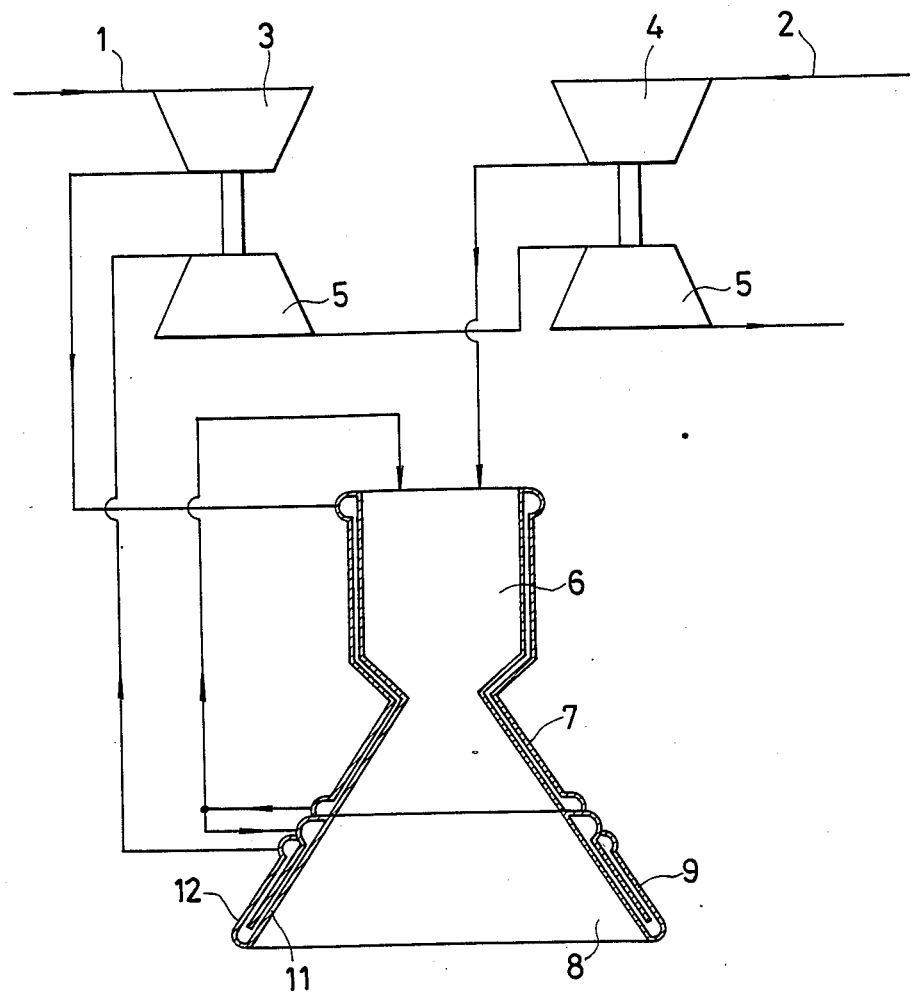
FIG. 1 is a schematic view showing the general construction of a liquid fuel rocket engine system by way of a preferred embodiment of the present invention.

Referring firstly to FIG. 1, there is shown in schematic view the general construction of an improved liquid fuel rocket engine system according to the invention. In this figure, there are seen provided a propellant or liquid hydrogen fed through a feed line designated at the reference numeral another propellant or liquid oxygen (oxidizer) fed through a feed line designated at 2, a propellant or liquid fuel booster at 3 adapted to boost up the pressure of the propellant 1, an oxidizer booster at 4 adapted to boost up the pressure of the propellant 2, a booster driving units 5 adapted to drive such propellant boosters 3, 4 in operative rotating motion, for example, gas turbines or the like, a liquid fuel combustor at 6, a combustor cooling jacket at 7 extending around the circumference of the combustor 6, and a high-expansion nozzle at 8 provided on the side of propelling gas jet outlet. Also, on the circumference of the divergent extension of the high expansion nozzle 8, there is provided an expansion nozzle cooling jacket 9 which is adapted to take off part of the propellant 1 cooled off while passing through the combustor cooling jacket 7 and adapted to reheat thus branched propellant 1 with heat conducted from the high expansion nozzle 8. The combustor cooling jacket 7 is provided with down passes 11 and up passes 12.

According to this liquid fuel booster system of the invention, it is notable that the propellant 1 is firstly boosted to a specified pressure level by way of the fuel booster 3, thereafter it is directed to pass through the combustor cooling lo jacket 7 in line of the booster system, where it effeots the cooling of the combustor 6 while passing therethrough. Then, the propellant 1 which gains a temperature rise while cooling the combustor 6 is redirected partly to the nozzle cooling jacket 9 on one hand, and the remaining or the major part of the propellant 1 is fed to the combustor 6 on the other hand, where it reacts with the high pressure propellant (the oxidizer) 2 fed concurrently thereinto so that it is combusted or deflagrated with the propellant 2 and produces a large volume of combustion gas, and then thus produced combustion gas is discharged outwardly by way of the high expansion nozzle 8, thus producing a great thrust or propulsive effort of the rocket engine system. That minor part of the propellant 1 which gains a temperature rise while passing through the nozzle cooling jacket 9 is given an increase in volume, hence with an increased pressure in the confined space from such heat and is redirected over to the booster driving units 5, where it is made available for the energizing of the same with thus increased pressure.

The present construction according to the invention may result in an advantageous effect in operation, as follows:

By way of this preferred embodiment of the invention, the propellant comprises a fuel component or liquid hydrogen and an oxidizer component or liquid oxygen, which components are designed to be pressurized to a specified pressure level by means of each of the boosters 3 and 4 in the engine system, respectively. It is arranged that the whole quantity of liquid hydrogen under pressure is directed passing through the combustor cooling jacket 7, with which the combustor 6 is cooled off.

With this arrangement, the propellant 1 or liquid hydrogen is caused to be heated up to 140° K. After having passed through the combustor cooling jacket 7 with the combustor 6 cooled off, major part of liquid hydrogen is then redirected into the combustor 6 so that it is reacted with liquid oxygen to be combusted therein, thus forming a large volume of combustion gas, and thus producing a great propulsion effort for the rocket engine.

On the other hand, minor part of liquid hydrogen which has passed through the combustor cooling jacket 7 is directed into the nozzle cooling jacket 9 for cooling off the high expansion nozzle 8, thus gaining a temperature rise up to approximately 600° K., and thus having a further increase in pressure.

Consequently, with thus obtained potential energy in the form of increased pressure of liquid hydrogen heated to that temperature being directed to the booster driving units 5, it is now made available to have these booster driving units energized further in acceleration, thus producing an output increased accordingly.

Figure 3:
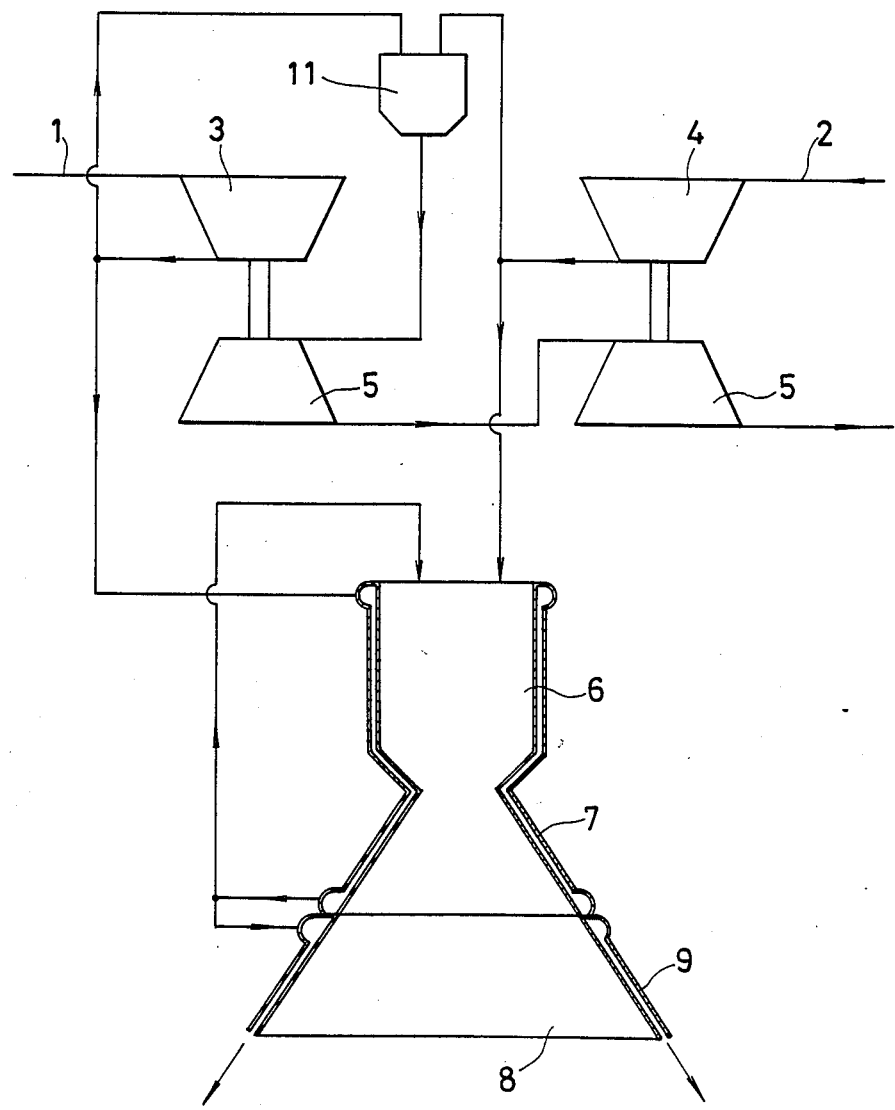
Figure 4:
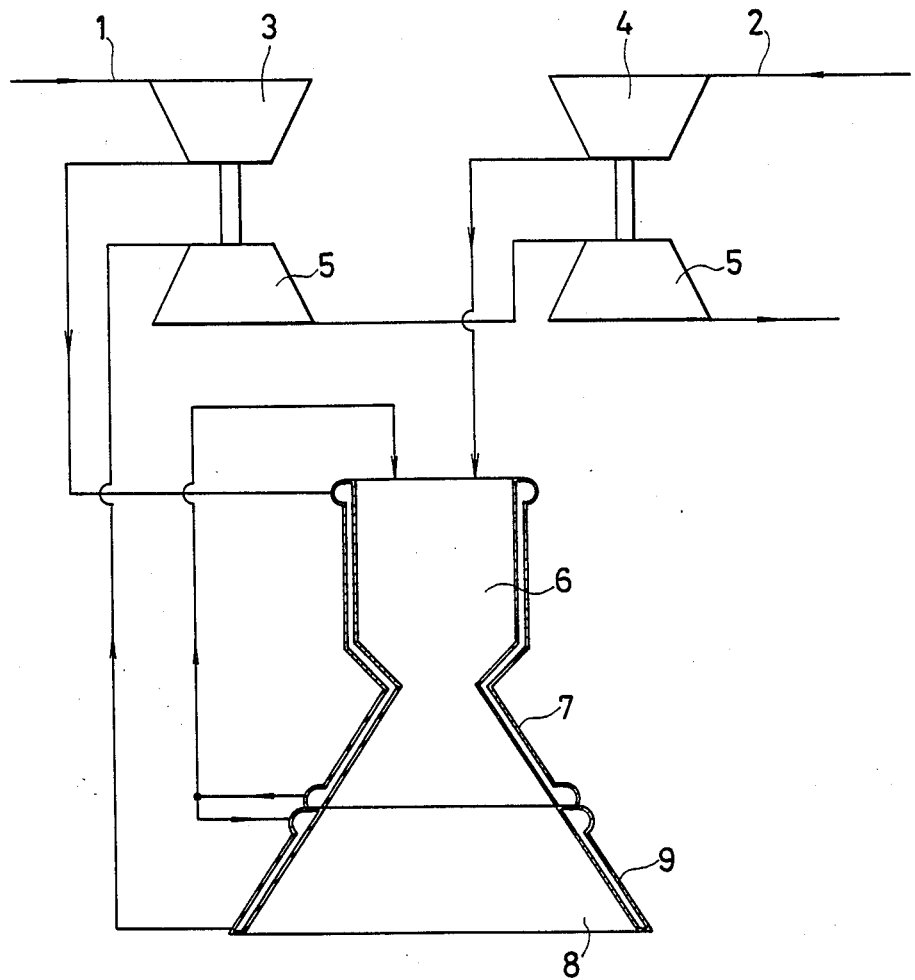

Now, referring to FIGS. 3 and 4 which show a typical construction of the conventional gas-generation cycle type rocket engine, on which the present invention is based, the following is a review in comparison of this conventional construction with the preferred embodiment of the invention shown above.

According to this typical example of the conventional propellant booster system with the employment of a subcombustor 11 as shown in FIG. 3, it is noted that liquid hydrogen having cooled with the high expansion nozzle 8 is then redirected into the nozzle cooling jacket 9, and thereafter it is merely discharged outwardly. In this respect, liquid hydrogen serves as a coolant alone, and therefore its potential energy as attained in the form of increased pressure is left unused to practice at all. More specifically, it is arranged such that minor parts of the propellants 1 and 2 are introduced into the subcombustor 11 for the purpose of energizing the boosters 3 and 4.

In contrast, it is advantageous according to the system shown in FIG. 4, that the potential energy of liquid hydrogen as gained from the cooling of the high expansion nozzle 8, which was heretofore exhausted in waste, is utilized with intention as a potential power source for driving the boosters in the system. However, since the flow of hydrogen is confined to one direction in the down pass system, the heat absorbing efficiency of hydrogen has been low. The present invention provides the nozzle cooling jacket 9 with the new down-up pass system, and for this arrangement, it will do with ease only by a slight rectification of the nozzle cooling jacket 9 to the reduction to practice of the present invention, accordingly.

Now, without the subcombustor 11 adopted, and without any particular means to accompany therewith in the system, it is naturally possible to have such advantageous effect of affording a light-weight and a simpler construction of the system. In addition, by virtue of the advantage that the driving medium made available for the booster driving units 5 has a lower temperature in comparison with the conventional system that uses the combustion gas from the subcombustor 11, it is advantageous that the operating conditions of the booster driving units 5 may be relieved accordingly, thus ensuring a longer service life and a higher reliability in operation of the rocket engine. Furthermore, since the propellant or liquid hydrogen which is preliminarily placed under a certain level of pressure by the booster 3 and the combustor cooling jacket 7 while passing therethrough has its potential energy in the form of pressure further increased by heat absorbed from the high expansion nozzle 8 while passing therethrough, thus affording a higher energy potential, though it has a relatively low temperature, in comparison with the combustion gas produced in the subcombustor 11 in the conventional arrangement. With such advantages of the present invention that may contribute much to the utility of waste heat from the combustor 8, there is afforded a substantial improvement in the rocket engine system which is adaptable to an upper stage module for the space shuttle craft and the like application, accordingly.

Figure 2:
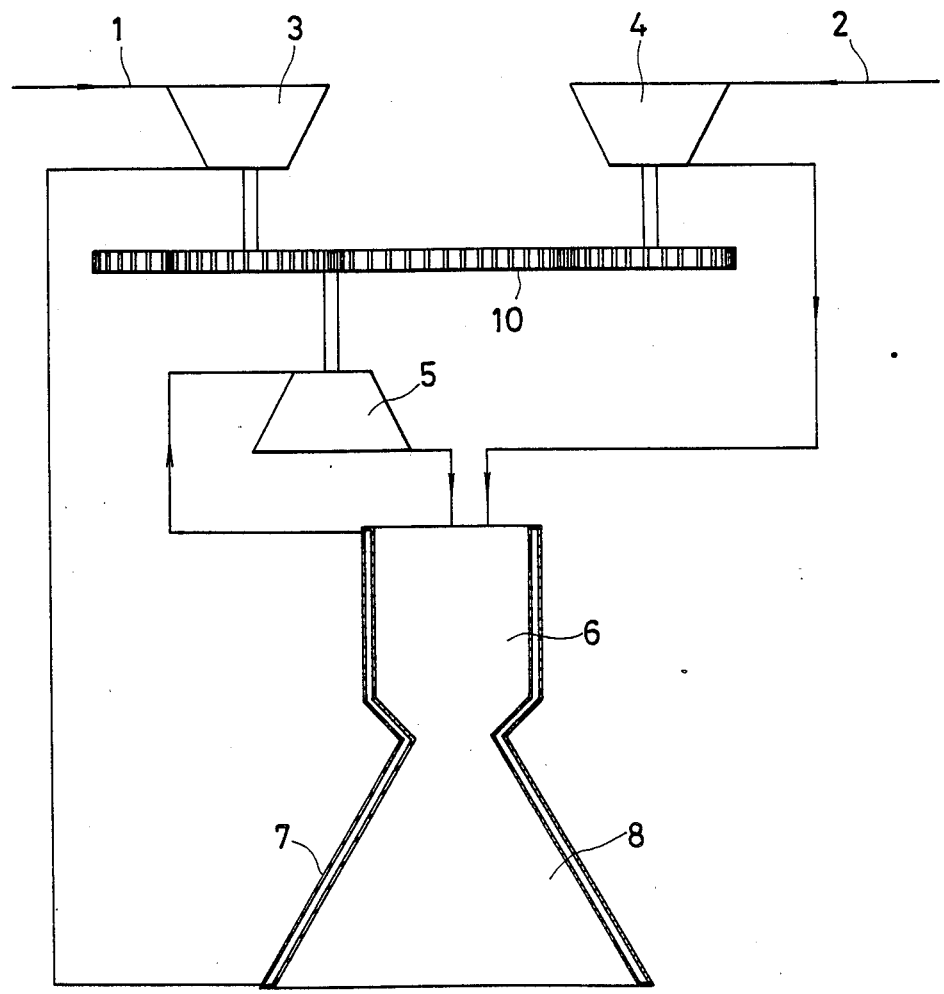
FIGS. 2, 3 and 4 are similar schematic views showing the typical constructions of convention rocket engine system, respectively.
Figure 5:
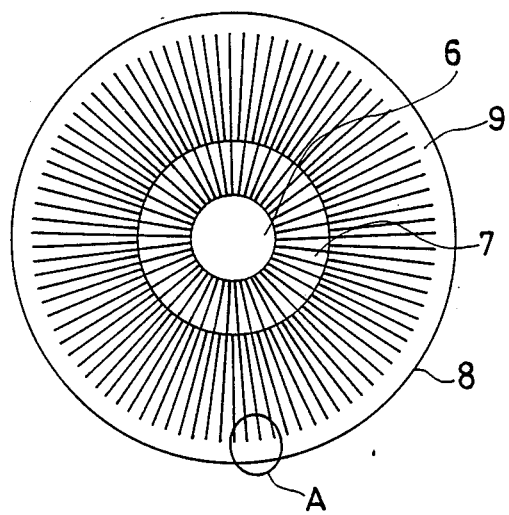
FIG. 5 is a view from underneath of the skirt shown in FIG. 1.
Figure 6:
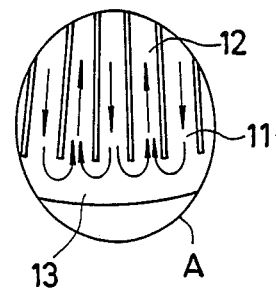
FIG. 6 is an enlargement of A in FIG. 5.

Referring to FIG. 5, which shows the view from underneath of the skirt of FIG. 1 including the high expansion nozzle 8 and FIG. 6, which shows the enlarged sectional view of the lower part A of the expansion cooling jacket 9 of FIG. 2, it should be noted that there is an arrangement of cooling tubes lined in the expansion nozzle cooling jacket 9 in which these cooling tubes 11, 12 alternate in their up and down flow directions with respect to the nozzle 8. The lower end of each cooling tube is connected to each other in such a way that the propellant 1 going downward is deflected sideways and then goes upward as shown in Fig.3. (This construction is called a "down-up pass system" here).

According to this down-up system, the total sectional area of the cooling tubes becomes a half of that for either a down pass or an up pass system, in which the propellant flows only in one direction. Therefore, provided that the power output of the booster driving unit 5, which pressurizes the fuel, is held constant (the power output is proportional to the flow rate of the propellant through the turbine), the flow velocity of the propellant has to be doubled since the flow rate of the propellant 1 used for driving the turbine needs to remain unchanged. Noting also that the cooling efficiency is proportional to the 4/power of the flow velocity, the heat absorbing efficiency at the expansion nozzle is improved by 74% with the above down-up pass system. This means an increase in the actual amount of heat absorbed by the propellant 1 at the expansion nozzle 8.

Owing to the increase in the cooling efficiency, the amount of the propellant 1 that is directed to the expansion nozzle can be minimized to the effect that the amount of the propellant 1 directed to the combustor 6 increases in turn. Also, the temperature of the propellant 1 heated at the nozzle 8 becomes higher, and thus the outputs of the driving unit 5 an engine itself are improved. In other words, for the same output the weight of the engine can be reduced since the nozzle cooling jacket 6 can be made shorter. In the case of a 300 kg engine, for example, the weight can be reduced by 10% (30 kg). As is well known, a weight reduction is of crucial importance for rocket engines. If an engine is lighter, the maximum weight of payload such as an artificial satellite or the like can be greater. For the same weight of payload, because of the smaller weight of the rocket the necessary amount of fuel and the size of fuel tanks may be smaller, and their supporting structure can be lighter, all resulting in a still lighter rocket and a much higher efficiency.

Figure 7:
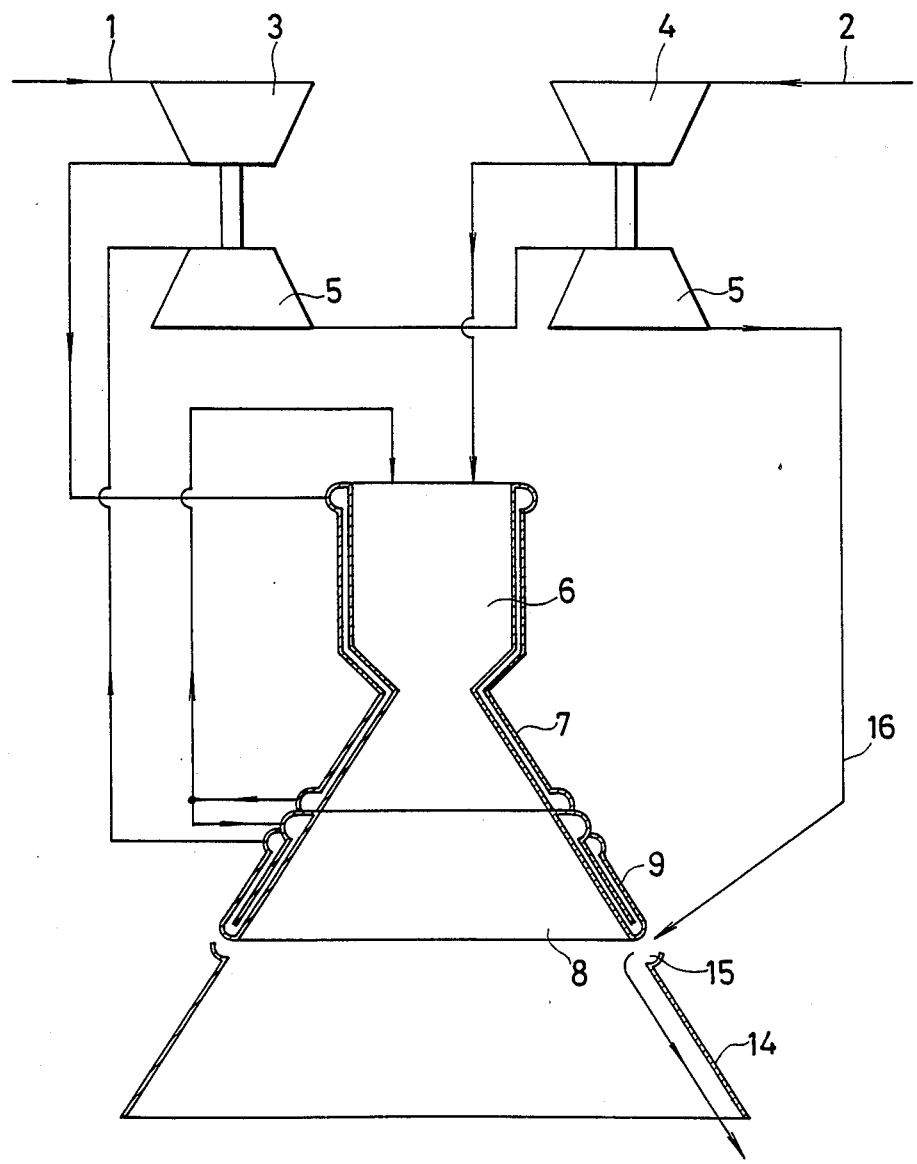
FIG. 7 is a schematic view showing the general construction of a preferred embodiment of the present invention as in FIG. 1.

Referring to FIG. 7, an arrangement is shown in which the propellant 1 that has driven the turbine of the booster driving units 5 is directed to merge into the combustion gas flow through a turbine exhaust gas manifold 15.

Figure 8:
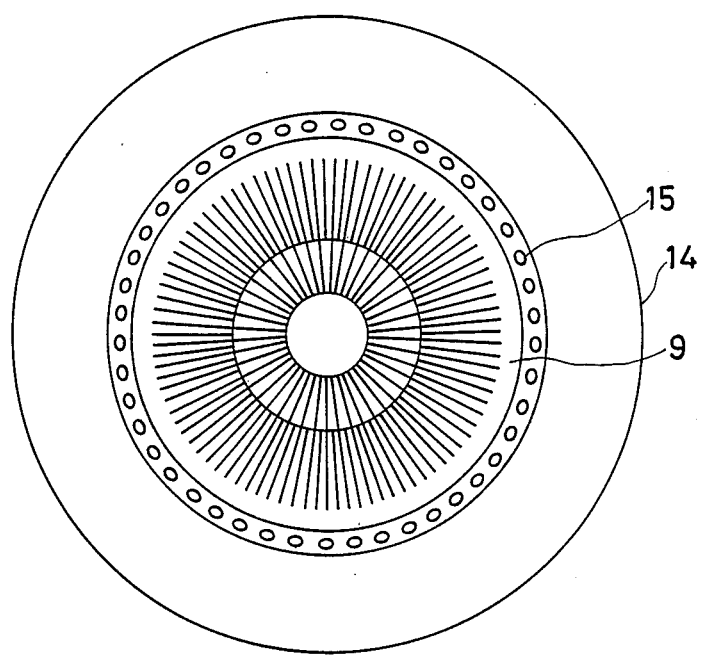
FIG. 8 is a view from underneath of the skirt shown in FIG. 7.

Referring to FIG. 8, the skirt of FIG. 7 is shown from underneath.

The propellant 1 that has driven the booster driving units 5 is led through a turbine exhaust gas duct 16 to merge into the combustion gas flow rom the turbine exhaust gas manifold 15 that is open to a non-cooled nozzle extension 14 disposed in the downstream position of the nozzle cooling jacket 9. The expansion of the gas, when merging, increases the thrust of the engine.

In an experiment that has been carried out, an increase of 4–5 seconds in the specific impulse $I_{SP}$ over a previously observed value of about 450 seconds was observed, where the specific impulse $I_{SP}$ is given by:

$$I_{SP} = \frac{\text{Thrust}}{\text{Flow rate of consumed propellant (kg/sec.)}}$$

That is to say, the amount of consumed fuel can be reduced by about 1%.

In the case of the H-1 rocket, for which the propellant (for the first two stages) of liquid hydrogen and liquid oxygen weighs about 9 tons, the total weight of the fuel alone can be reduced by 90 kg for the same thrust.

Therefore, the third stage rocket on top of the second stage rocket may be heavier by about 90 kg increasing the weight of payload that can be carried.

Considering that a stationary artificial satellite normally weighs 500 to 600 Kg and each setup to be used in space experiments now planned weighs merely a few kilograms, the importance of the weight reduction discussed above can be understood.

Furthermore, since the propellant 1 works also as a coolant when flowing along the inner wall of the non-cooled nozzle extension 14 by way of a film cooling effect, the non-cooled nozzle extension does not have to be cooled otherwise by, for example, a jacket.

Figure 9:
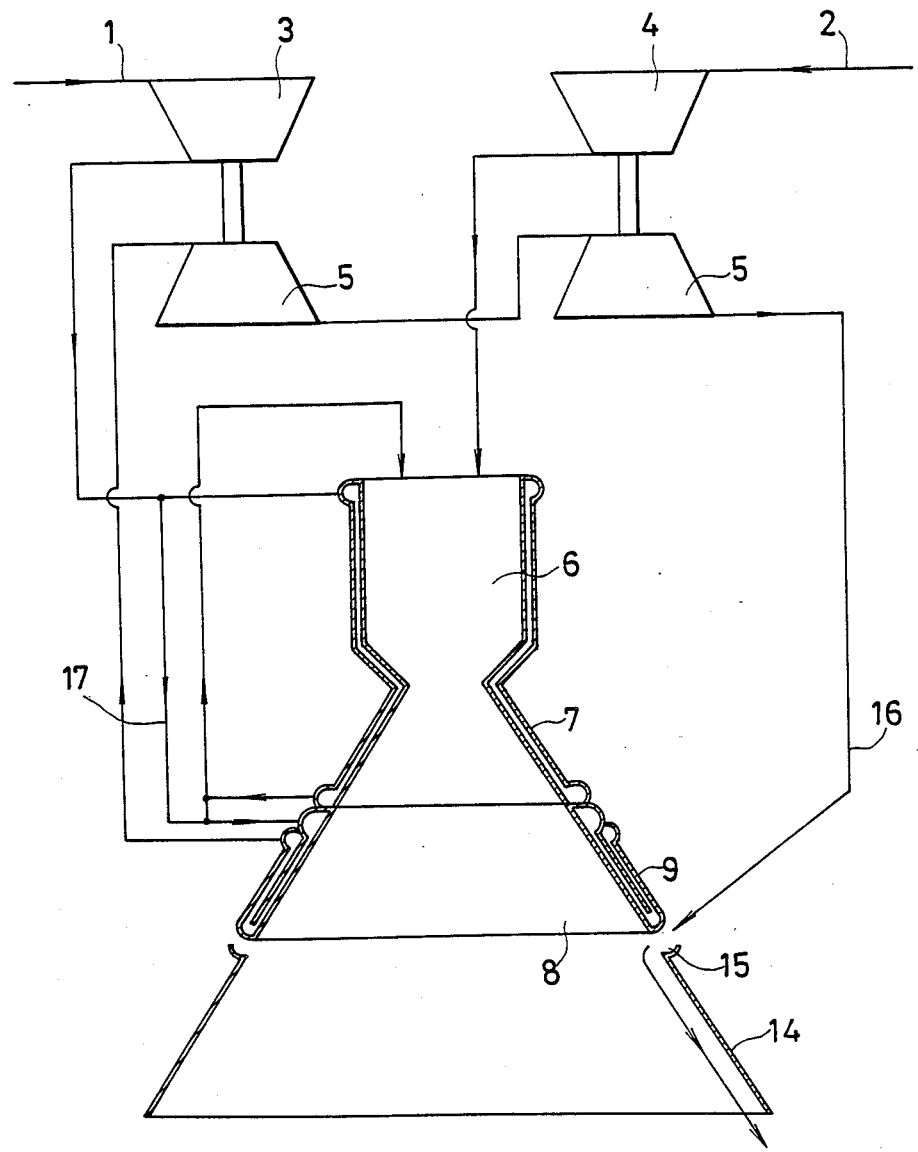
FIGS. 9 to 11 are schematic view showing the general construction of other preferred embodiments of the present invention as in FIG. 1.

Referring to FIG. 9, the engine shown in FIG. 8 is seen here with a direct cooling line 17. The direct cooling line 17 is disposed between the liquid fuel booster 3 and the nozzle cooling jacket 9 in order to supply part of the propellant 1 pressurized in the liquid fuel booster 3 to the nozzle cooling jacket 9 directly.

For a greater thrust the nozzle cooling jacket 9 has to be larger. It is possible, however, for a larger nozzle cooling jacket to be destroyed because of overheating. Now that it is necessary to improve the cooling efficiency of the nozzle cooling jacket 9, the propellant 1 whose temperature is low and pressure high is supplied directly to the nozzle cooling jacket 9.

Because of lower temperature of the propellant 1 upon entering the nozzle cooling jacket 9, the cooling efficiency can be improved without increasing the flow rate of the propellant 1 which is used to drive the booster driving units 5 very much. In other words, damage can be avoided when the combustion in the combustor 6 becomes excessive due to a possible overrun of the boosters 3, 4 overheating the combustor cooling jacket 7 and the nozzle cooling jacket 9.

While it is possible to use a valve at the diverging point to the direct cooling line 17, an orifice comprising a narrow tube is considered to be better.

Figure 10:
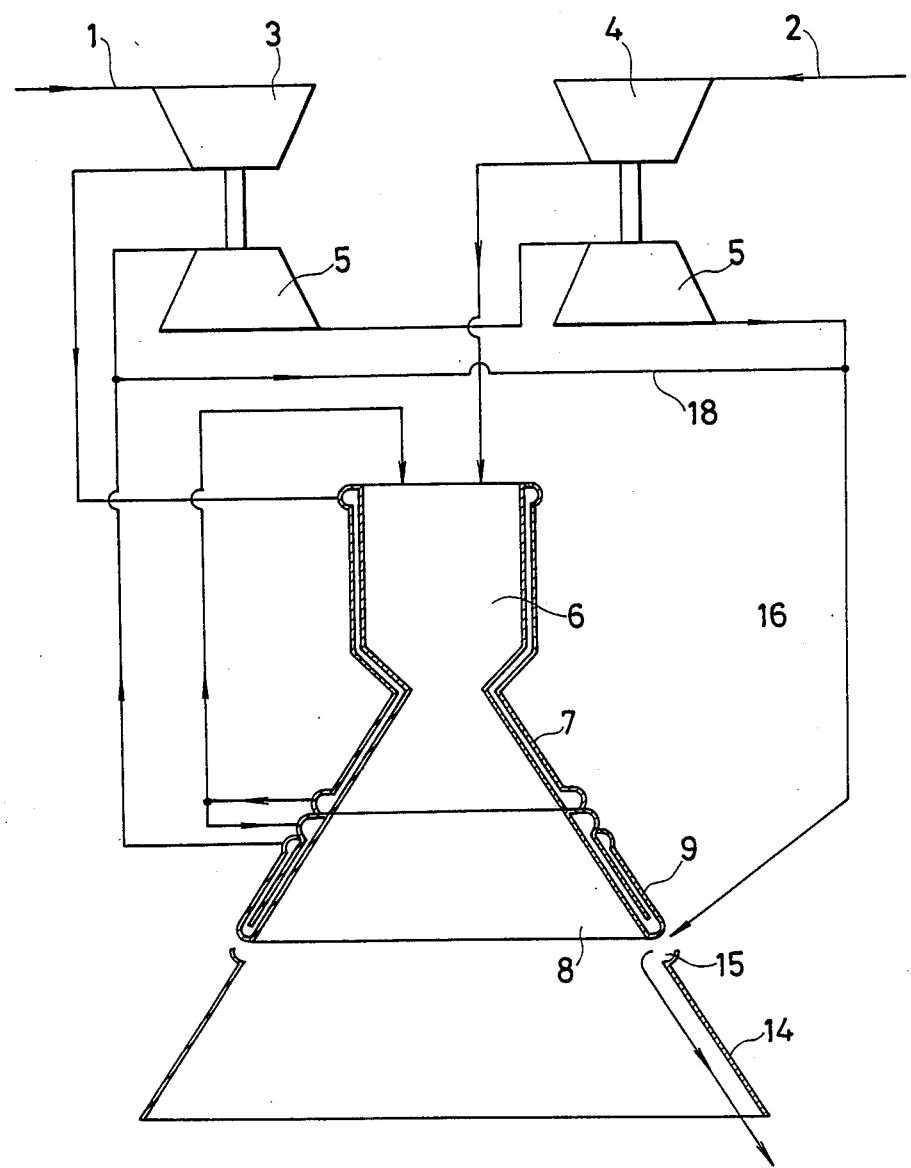

Referring to FIG. 10, a turbine gas bleed line 18 is disposed in the engine shown in FIG. 8. Here, the turbine gas bleed line 18 is disposed to direct part of the propellant 1 to the turbine exhaust gas duct on the way from the nozzle cooling jacket 9 to the booster driving units 5, bypassing the booster driving units 5.

With such an arrangement damage to the high expansion nozzle 8, etc., can be avoided when the combustion in the combustor 6 becomes excessive due to an increase in the amount of the propellant driving the booster driving units 5 with the resulting overrun of the boosters 3,4.

While it is possible to use a valve to direct part of the propellant 1 to the turbine gas bleed line 18, a narrow tube connected directly and used as an orifice should be better.

Figure 11:
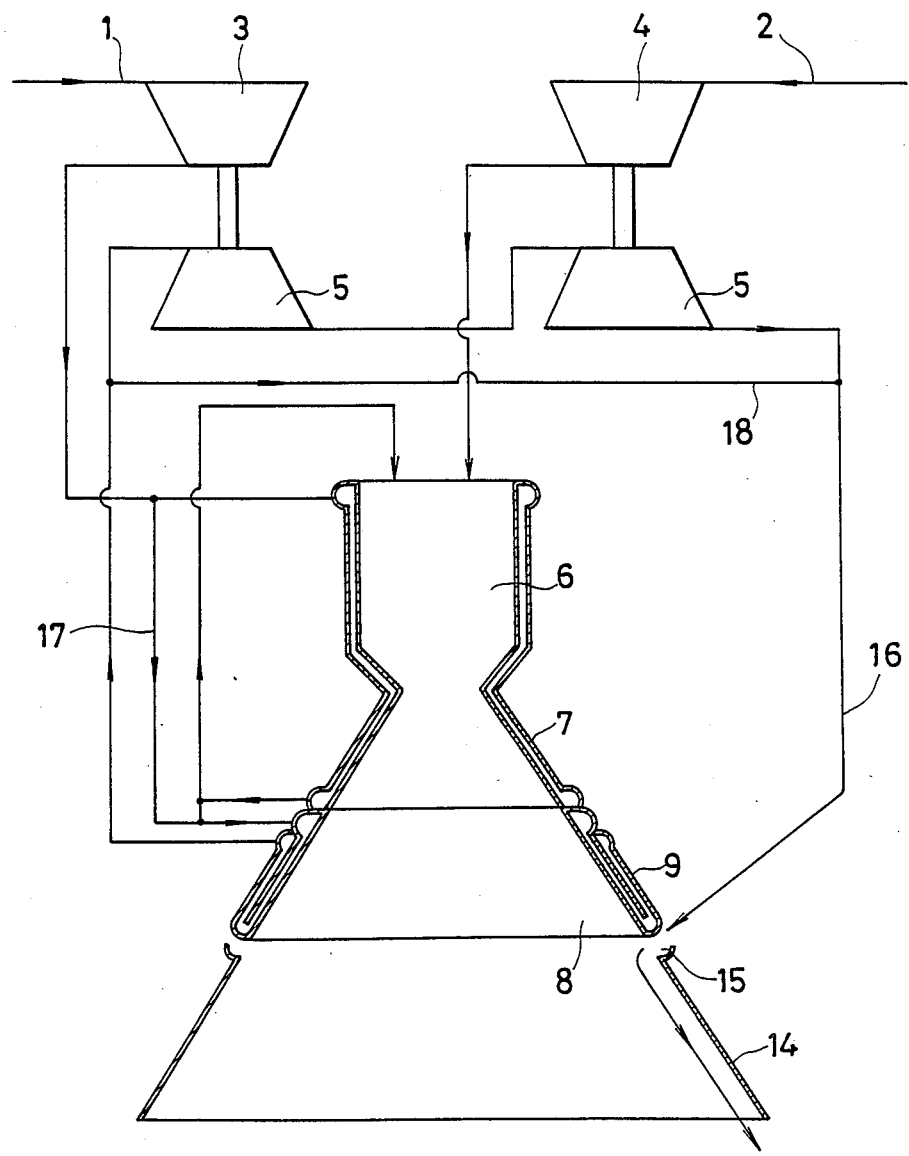

Referring to FIG. 11, the turbine gas bleed line 18 of Fig. 10 and the direct cooling line 17 of FIG. 9 are both incorporated into the engine shown in FIG. 8.

With this arrangement the flow rate of the propellant through the booster driving units 5 can be held within an optimal range even if the spread of the high expansion nozzle 8 is made grater to increase the thrust.

While the present invention has been described in detail by way of a specific preferred embodiment thereof, it is to be understood that the present invention is not intended to be restricted to the details of the specific constructions shown in the preferred embodiment, but to the contrary, the present invention can of course be practiced in many other arrangements to an equal advantageous effect in accordance with the foregoing teachings without any restriction thereto and without departing from the spirit and scope of the invention.

According to the present invention, there is attained an improved liquid fuel rocket engine wherein the propellant can efficiently be raised up to a specified high pressure level with a simple rectification in construction to provide a reserve of pressure available for the driving of the propellant (liquid fuel) booster, without the use of an undesired subcombustor. Also, there is provided a relatively simple construction of a liquid fuel rocket engine with a light-weight and hence a less production cost, yet with a high reliability in operation.

It is also to be understood that the appended claims are intended to cover all of such generic and specific features particular to the invention as disclosed herein and all statements relating to the scope of the invention, which as a matter of language might be said to fall thereunder.

What is claimed is:

1. A liquid fuel rocket engine having a fuel booster means (3) for boosting the pressure of fuel component, an oxidizer booster means (4) for boosting the pressure of oxidizer component, two booster driving means for energizing said two booster means, a combustor means (6) wherein said booster fuel and oxidizer components are put into combustion to produce a combustion gas to be discharged outwardly, a combustor cooling jacket means (7) mounted operatively around the circumference of said combustor means, a high expansion nozzle means (8) extending from said combustor means (6), and an expansion nozzle cooling jacket means (9) disposed operatively around the circumference of said high expansion nozzle means (8), said engine having an outlet from said fuel booster means (3) connected operatively to an inlet to said combustor cooling jacket means (7), having an outlet from said combustor cooling jacket means (7) connected operatively to a fuel inlet to said combustor means (6) and to an inlet to said expansion nozzle cooling jacket means (9), and having an outlet from said expansion nozzle cooling jacket means (9) connected operatively to an inlet to said two booster driving means (5), respectively;

said engine is characterized in that said expansion nozzle cooling jacket means (9) comprises an alternating arrangement of upflow and downflow tube means (11, 12) along the surface of said high expansion nozzle means (8), said upflow and downflow tube means being connected to each other at their downstream ends (13), said outlet from said combustor cooling jacket means (7) being connected to the downflow tube means (11), and outlets from said upflow tube means (12) being connected to an inlet to one of said booster driving means (5), said engine being further characterized in that a non-cooled nozzle extension means (14) is disposed in the downstream position from said expansion nozzle cooling jacket means (9) and a turbine exhaust gas manifold means (15) is disposed in said non-cooled nozzle extension means (14), said turbine exhaust gas manifold means (15) being connected to one of said booster driving means (5) through a turbine exhaust gas duct means (16).

2. The liquid fuel rocket engine of claim 1, wherein said engine is further characterized in that a direct cooling line means (17) is disposed between said liquid fuel booster means (3) and said expansion nozzle cooling jacket means (9).

3. The liquid fuel rocket engine of claim 1, wherein said engine is further characterized in that a turbine gas bleed line means (18) is disposed between said turbine exhaust gas duct means (16) and a duct means connecting said expansion nozzle cooling jacket means (9) to one of said booster driving means (5).

* * * * *

UNITED STATES PATENT AND TRADEMARK OFFICE
CERTIFICATE OF CORRECTION

PATENT NO. : 4,879,874
DATED : November 14, 1989
INVENTOR(S) : Yukio Koyari; Eiji Sogame, Kenji Kishimoto; Yojiro Kakuma It is certified that error appears in the above-identified patent and that said Letters Patent is hereby corrected as shown below:

On the title page:

Please correct the spelling of the inventor

Kanji Kishimoto to be Kenji Kishimoto

Signed and Sealed this

Fifth Day of November, 1991

Attest:

HARRY F. MANBECK, JR.

*Attesting Officer*   *Commissioner of Patents and Trademarks*